United States Patent [19]

Fergie

[11] Patent Number: 5,015,036
[45] Date of Patent: May 14, 1991

[54] APPARATUS FOR USE AS HEADREST
[75] Inventor: B. Christine Fergie, Anaheim, Calif.
[73] Assignee: Decorator Discount DBA Decor Resource, Fullerton, Calif.
[21] Appl. No.: 920,592
[22] Filed: Oct. 20, 1986
[51] Int. Cl.$^5$ ............................................. A47C 1/10
[52] U.S. Cl. .................................. 297/397; 297/391
[58] Field of Search ..................... 297/397, 220, 391; 5/434

[56] References Cited

U.S. PATENT DOCUMENTS

| | | |
|---|---|---|
| 1,935,685 | 11/1933 | White . |
| 2,461,880 | 10/1946 | Curran . |
| 2,983,310 | 4/1957 | Warlick et al. . |
| 3,129,975 | 9/1962 | Emery . |
| 3,578,383 | 4/1964 | Earl . |
| 3,608,964 | 9/1971 | Earl ................................. 297/397 |
| 4,042,278 | 8/1977 | Jensen . |
| 4,074,373 | 2/1978 | Garofalo . |
| 4,114,948 | 9/1978 | Perkey ............................. 292/397 |
| 4,165,125 | 8/1979 | Owen . |
| 4,206,945 | 6/1980 | Kifferstein . |
| 4,565,405 | 1/1986 | Mayer .............................. 297/397 |

FOREIGN PATENT DOCUMENTS 3123679 12/1982 Fed. Rep. of Germany ...... 297/391
1193084 4/1959 France ............................. 297/397

*Primary Examiner*—Kenneth J. Dorner
*Assistant Examiner*—Gerald A. Anderson
*Attorney, Agent, or Firm*—Frank J. Uxa, Jr.

[57] ABSTRACT

An apparatus useful as a headrest in conjunction with a seat having a back and a head support extending upwardly from the seat back comprises a pillow defined by mutually opposing end walls, a curved sidewall and an opposing, preferably a substantially flat, sidewall, and adapted to be removably secured to the head support so that the head or neck of a human person seated in the seat contracts the curved sidewall; and at least one securement element affixed to the opposing sidewall of the pillow and capable of being placed around the head support, either substantially transverse or parallel to the longitudinal axis of the head support to removably secure the pillow to the head support.

13 Claims, 1 Drawing Sheet

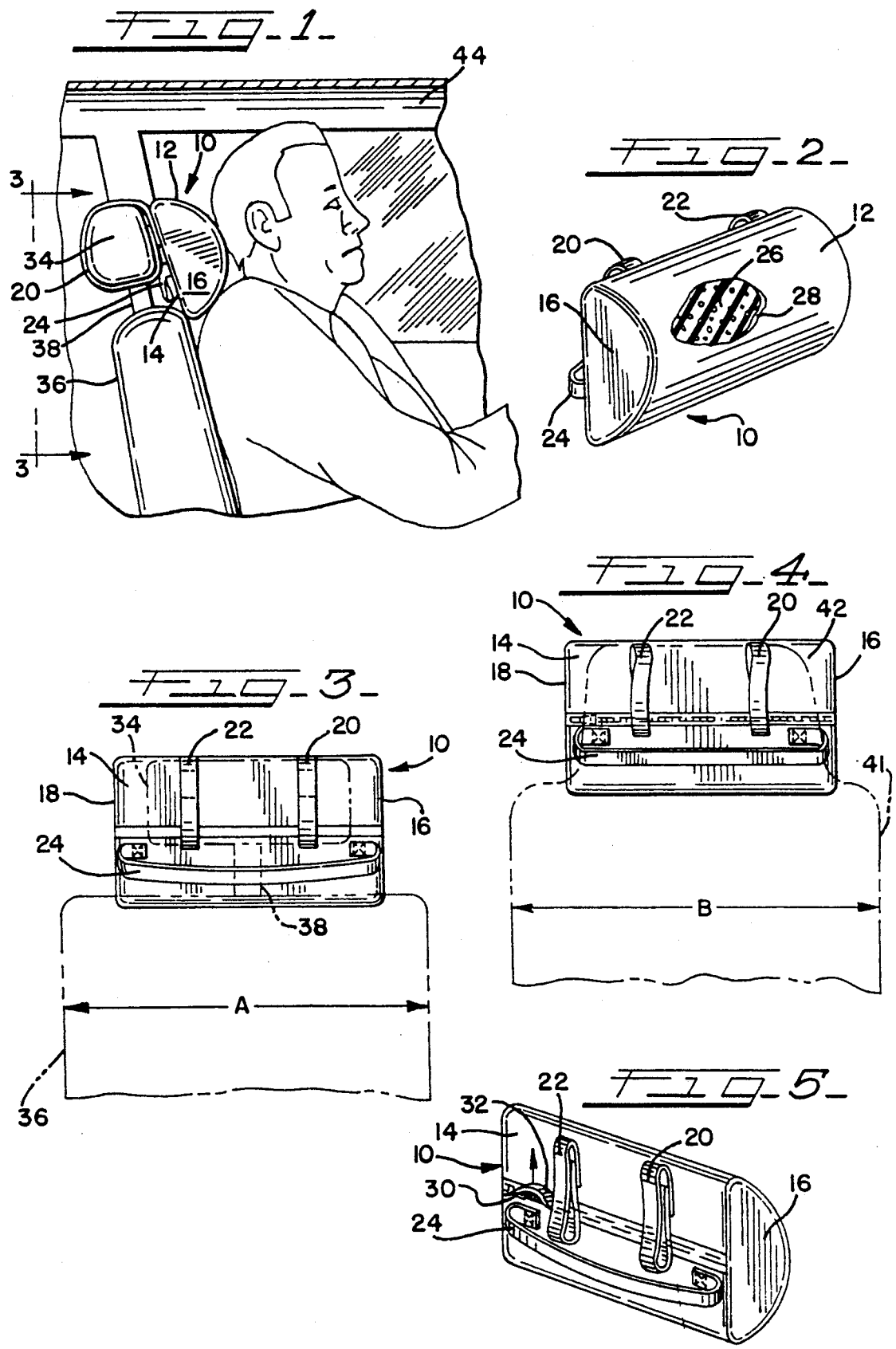

APPARATUS FOR USE AS HEADREST

The present invention relates to an apparatus useful as a headrest. More particularly, the invention relates to a headrest for use in conjunction with a seat having a back and a head support extending upwardly from the seat back.

Since the mid 1970's, private passenger vehicles, such as automobiles, trucks and the like, in the United States have been required to have seats equipped with head supports. In general, these head supports extend upwardly from the top of the seat back. These head supports may be an integral part of and extend upwardly from the top of the seat back, or may be adjustable and located on one or more rods which extend upwardly from the top of the seat back. In any event, these head supports are designed to reduce the severity of head and neck injuries which often occur as the result of "whiplash" in vehicular accidents.

The following U.S. Patents were reviewed during the course of preparing this application: U.S. Pat. Nos. 4,206,945; 4,165,125; 4,074,373; 4,042,278; 3,578,383; 3,129,975; 2,983,310; 2,461,880; and 1,935,685.

Because of the design of the seat and/or the upwardly extending head support and/or the posture of the seated driver/passenger, these head supports are rarely used except in the event of an accident. People who travel in vehicles equipped with such head supports, particularly those who travel long distances, find little or no relief in these head supports from tiredness and head/neck muscle fatigue which often results from such travel. Thus, there is a clear need for a headrest system for use on seats, in particular vehicle seats.

Therefore, one object of the present invention is to provide a headrest for use in conjunction with a seat having a back, in particular a seat in a transportation vehicle. Other objects and advantages of the present invention will become apparent hereinafter.

An apparatus useful as a headrest in conjunction with a seat having a back with a latitudinal (cross wise as opposed to up and down) axis and a head support extending generally upwardly from the seat back has been discovered. In general, the apparatus comprises pillow means defined by mutually opposing end walls, a curved sidewall and an opposing, preferably substantially flat, sidewall and adapted to be removably secured to the head support so that the head or neck of a human person seated in the seat contacts the curved sidewall. In one broad aspect, the apparatus further comprises at least one securement means affixed to the opposing sidewall of the pillow means and is capable of being placed around the head support substantially transverse of (i.e., substantially perpendicular to) the latitudinal axis of the seat back to removably secure the pillow means to the head support. In another broad aspect, the apparatus further comprises at least one securement means affixed to the pillow means and capable of being placed around the head support substantially parallel to the latitudinal axis of the seat back to removably secure the pillow means to the head support.

The present invention provides substantial advantages. For example, the present apparatus provides firm neck/head support to ease the start-stop head motion caused by travel on crowded freeways and streets. The present headrest is particularly useful for individuals who spend substantial amounts of time driving or riding in automobiles. This support and comfort is easily provided while taking advantage of a modern safety feature, i.e., the head support, of automobiles and trucks. Also, by reducing the stress and muscle fatigue commonly associated with driving vehicles, the present headrest itself is a safety feature. In addition, this headrest is portable and can be in conjunction with various vehicles. In summary, the present apparatus is structured relatively simply, is easy and inexpensive to manufacture, makes use of an existing safety feature in vehicles, and provides additional comfort and safety, particularly to those persons who spend substantial amounts of time driving/riding vehicles.

The present pillow means is preferably at least partially, more preferably substantially totally, filled with resilient material to provide a cushioning effect to the head/neck of the person using it. This resilient material is preferably formed in the shape of the pillow means and covered with an outer, more preferably ornamental, covering or cover made, for example, of designer fabric. This outer covering can be customized with regard to color, material of construction, fabric design and the like to suit the desires of the individual user and/or to match the interior of the vehicle in conjunction with which the headrest is to be used. The cover preferably includes an opening means adapted to be opened, as desired, to provide access to the inner portion, e.g., the resilient material, of the pillow means. For example, the opening means may involve a conventional zipper device. Such ready access allows for easy cleaning or replacement of the inner portion, as desired. Also, the inner portion and the cover can be separately cleaned or replaced, if desired. Preferably, the opening means is located on or near the substantially flat sidewall of the pillow means. This is preferred so that the opening means does not come into contact with the neck/head of the person using the present headrest.

Any suitable resilient material or combination of such materials may be employed in the present pillow means. Examples of such resilient materials include foam rubber, sponge, polyurethane foam and the like. Polyurethane foam is a preferred resilient foam since this material is durable, easy to shape, fire resistant and is relatively easy to clean.

The shape of the pillow means is important. The opposing, preferably substantially flat, sidewall provides a stable surface contacting the head support of the seat when the present head rest is secured to the head support. The preferred substantially flat contact surface reduces any extraneous and unwanted movements of the headrest when it is in use and, in addition allows the present headrest to be used in conjunction with variously shaped head supports. On the other hand, the curved sidewall is more conducive to contact with a person's head/neck. Preferably, the curved sidewall is defined by a substantially uniform convex surface. This convex surface "fits" or cradles the person's head/neck as contact is made, thus increasing the comfort provided by the headrest. More preferably, the curved sidewall is defined by substantially one-half of a right, circular cylindrical surface.

In one embodiment, the present securement means is preferably affixed, more preferably permanently affixed, to the opposing, preferably substantially flat sidewall of the pillow means. In one specific embodiment, the present headrest comprises two securement means each of which is affixed to a different location on the substantially flat sidewall. Each of these securement means preferably comprises a first strip containing hooks and a second strip containing loops. The hooks and loops are adapted to engage together when the first and second strips are placed around the head support to removably secure the pillow means to the head support. For example, such first and second strips may comprise Velcro hooks and Velcro loops, respectively. Such strips are particularly useful when the securement means is to be placed around the head support in a direction substantially transverse to (perpendicular to) the latitudinal axis of the seat back, i.e., the axis through the side-to-side dimension of the seat back.

The securement means is preferably sized so as to be incapable of being placed around the body of the seat back, i.e., the seat back below the head support.

In a specific embodiment, the securement means comprises at least one, and preferably only one, loop of a elastic material and is preferably affixed, more preferably permanently affixed, to the substantially flat sidewall of the pillow means. Elastic materials, such as natural rubber, synthetic rubber, and the like, may be used to construct such loop or loops. Such loop or loops of elastic material are particularly applicable when the securement means is to be placed around the head support in a direction substantially parallel to the latitudinal axis of the sat back.

These and other aspects and advantages of the present invention are set forth in the following detailed description and claims, particularly when considered in conjunction with the accompanying drawings in which like parts bear like reference numerals. In the drawings:

FIG. 1 is an illustration showing an embodiment of the present headrest in use.

FIG. 2 is a front side perspective view, partly in cross-section, of the headrest shown in FIG. 1.

FIG. 3 is a plan view taken along line 3—3 of FIG. 1.

FIG. 4 is a back plan view of the headrest in FIG. 1 shown in conjunction with an alternate head support.

FIG. 5 is a back side perspective view of the headrest shown in FIG. 1.

When headrest 10 is removably secured to either adjustable head support 34 or stationary head support 42, as discussed above, it provides a very convenient place to rest one's head during long periods of driving or riding in an automobile 44, as illustrated in FIG. 1. Headrest 10 takes advantage of head supports, such as 34 and 42, which are conventionally included in transportation vehicles as safety devices to protect against head/neck whiplash injuries. While such built-in head supports are substantially effective in whiplash situations, they are often not properly located to serve as headrests under normal driving conditions. Headrest 10 acts to allow one to rest his/her head under normal driving conditions. Such headrest 10 is removably secured to the head support, it is portable and can be removed and used in other vehicles, as desired. The cover 28 of headrest 10 can be chosen from a great variety of fabrics, patterns and designs to suit the individual user. In short, the present headrest provides comfort and portability with little or no structural complexity, while being attractive and pleasing to the eye.

Headrest 10 is shown in the drawing used in conjunction with two types of head supports commonly employed in automobiles.

In FIGS. 1 and 3, headrest 10 is shown in use with an adjustable head support 34 which extends upwardly from seat back 36 and is secured to seat back 36 by rod 38. The position of head support 34 is adjustable up and down relative to seat back 36. In this use, first and second hook/loop fastener combinations 20 and 22 are wrapped around head support 34 and secured in place by engaging the hooks and loops of each of combinations 20 and 22, respectively, together. Combinations 20 and 22 are wrapped around head support 34 in a direction substantially transverse, or perpendicular, to the latitudinal axis of seat back 36, represented by A in FIG. 3.

In certain situations, automobiles and other vehicles employ a seat back/head support construction as shown by the shadow lines in FIG. 4. This alternate seat back 40 includes a stationary, relative to the position of seat back 40, head support 42 which is an integral part of seat back 40, extending upwardly from the main body of seat back 40. In these situations, elastic band 24 is placed around head support 42 in a direction substantially parallel to the latitudinal axis of seat back 40, represented by B in FIG. 4. Elastic band 24 is sized so that when it is placed around head support 42 headrest 10 becomes removably secured to head support 34. Elastic band 24 is sized so as to be incapable of being placed around the body of seat back 40. Elastic band 24 is also sized so as to be capable of being placed around head support 34 in a direction substantially parallel to the latitudinal axis of back seat 36.

Referring now to the drawing, a headrest, shown generally as 10, includes a half-right circular cylindrical front surface 12, a substantially flat back surface 14, and mutually opposing substantially flat side surfaces 16 and 18. Permanently affixed to back surface 14 are first and second hook/loop fastener combinations, e.g., Velcro strips, 20 and 22. Also permanently affixed to back surface 14 is an elastic band 24. Only one of the fastener combinations 20, 22 or elastic band 24 need be present on any one headrest 10. However, in order to increase the usefulness of headrest 10, both fastener combinations 20, 22 and elastic band 24 may be present.

Headrest 10 is filled with a preshaped polyurethane foam element 26 which provides the desired resilience to headrest 10. An ornamental cover 28 is fitted over foam element 26 to give headrest 10 an attractive appearance. The design or pattern and fabric or fabrics used for cover 28 may be individually chosen based on the desires of the user and/or the interior of the vehicle in which headrest 10 is to be most often used. Thus, headrest 10 may be constructed of materials which are customized to any one of a great number of specific situations. Cover 28 includes a zipper-like opening/closing mechanism 30 located across flat back surface 14, as shown in FIG. 5. Mechanism 30 allows access to foam element 26, e.g., for cleaning or replacing foam element 26. Mechanism 30 is covered by a flap 32 which acts to protect mechanism 30 and to remove mechanism 30 from view during normal use of headrest 10.

While this invention has been described with respect to various specific examples and embodiments, it is to be understood that the invention is not limited thereto and that it can be variously practiced within the scope of the following claims.

The embodiments of the present invention in which an exclusive property or privilege is claimed are as follows:

1. An apparatus useful as a headrest in conjunction with a first seat having a back of a given width having a latitudinal axis and a head support extending generally upwardly from said first seat and having a width smaller than the width of said first seat back or with a second seat having a back with a latitudinal axis and a head support extending generally upwardly from said second seat back, said apparatus comprising:

pillow means defined by mutually opposing end walls, a curved sidewall and an opposing sidewall, and adapted to be removably secured to said head support of said first seat or said second seat so that the head or neck of a human person seated in said first seat or said second seat contacts said curved sidewall;

at least one first securement means affixed to said pillow means and capable of being placed around said head support of said first seat substantially parallel to the latitudinal axis of said first seat back to removably secure said pillow means to said head support of said first seat; and at least two second securement means affixed to said pillow means and capable of being placed around said head support of said second seat substantially transverse to the latitudinal axis of said second seat back to removably secure said pillow means to said head support of said second seat.

2. The apparatus of claim 1 wherein said first securement means is incapable of being placed around said first seat back.

3. The apparatus of claim 2 wherein said first opposing sidewall is substantially flat, and said securement means comprises a loop of elastic material and is permanently affixed to said substantially flat sidewall of said pillow means.

4. The process of claim 1 wherein said pillow means is at least partially filled with resilient material.

5. The apparatus of claim 1 wherein said curved sidewall is defined by a substantially uniform convex surface.

6. The apparatus of claim 1 wherein said curved sidewall is defined by substantially one-half of a right, circular cylindrical surface.

7. The apparatus of claim 1 wherein said first securement means comprises a loop of elastic material.

8. The apparatus of claim 7 wherein each of said second securement means comprises a first strip containing hooks and a second strip containing loops, said hooks and loops being adapted to engage together when said first and second strips are place around said head support of said second seat to removably secure said pillow means to said head support of said second seat.

9. The apparatus of claim 1 wherein said first opposing sidewall is substantially flat, and said securement means is permanently affixed to said substantially flat sidewall.

10. The apparatus of claim 1 wherein said pillow means includes a cover.

11. The apparatus of claim 10 wherein said pillow means includes an opening means associated with said cover and adapted to be opened, as desired, to provide access to the inner portion of said pillow means.

12. The apparatus of claim 1 wherein each of said second securement means comprises a first strip containing hooks and a second strip containing loops, said hooks and loops being adapted to engage together when said first and second strips are placed around said head support of said second seat to removably secure said pillow means to said head support of said second seat.

13. The apparatus of claim 1 wherein each of said first and second securement means comprises a loop of elastic material.

* * * * *

UNITED STATES PATENT AND TRADEMARK OFFICE
CERTIFICATE OF CORRECTION

PATENT NO. : 5,015,036
DATED : May 14, 1991
INVENTOR(S) : B. Christine Fergie

It is certified that error appears in the above-identified patent and that said Letters Patent is hereby corrected as shown below:

Column 3, line 25; delete "sat" and insert in place thereof --seat--

Column 5, line 31; after "said" insert --first--

Column 6, line 13; delete "place" and insert in place thereof --placed--

Column 6, line 16; after "said" delete --first--

Column 6, line 17; after "said" insert --first--

Signed and Sealed this

Twenty-sixth Day of May, 1992

Attest:

DOUGLAS B. COMER

*Attesting Officer*   *Acting Commissioner of Patents and Trademarks*